United States Patent
Morise (10) Patent No.: US 11,441,678 B2
(45) Date of Patent: Sep. 13, 2022

(54) VEHICLE PARKING LOCK MECHANISM

(71) Applicant: TOYOTA JIDOSHA KABUSHIKI KAISHA, Toyota (JP)

(72) Inventor: Masaru Morise, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/305,308

(22) Filed: Jul. 2, 2021

(65) Prior Publication Data

US 2022/0090678 A1    Mar. 24, 2022

(30) Foreign Application Priority Data

Sep. 24, 2020 (JP) .............................. JP2020-160232

(51) Int. Cl.
*F16H 63/34* (2006.01)
*B60T 1/00* (2006.01)

(52) U.S. Cl.
CPC .......... *F16H 63/3433* (2013.01); *B60T 1/005* (2013.01)

(58) Field of Classification Search
CPC ... F16H 63/3433; F16H 63/3425; B60T 1/005
See application file for complete search history.

(56) References Cited

U.S. PATENT DOCUMENTS

| 8,387,759 | B2* | 3/2013 | Prix | F16H 63/3416 192/219.5 |
|---|---|---|---|---|
| 2011/0005891 | A1* | 1/2011 | Hongawara | F16H 63/3416 192/219.4 |
| 2021/0396310 | A1* | 12/2021 | Kraemer | F16H 63/3416 |
| 2022/0018434 | A1* | 1/2022 | Morise | F16H 63/3416 |

FOREIGN PATENT DOCUMENTS

| DE | 102012012673 A1 * | 12/2013 | ............. F16H 63/18 |
|---|---|---|---|
| JP | 2002178891 A | 6/2002 | |
| JP | 2018141520 A | 9/2018 | |

OTHER PUBLICATIONS

U.S. Appl. No. 17/362,175, United States Patent and Trademark Office, filed Jun. 29, 2021, 58 pages.
U.S. Appl. No. 17/362,089, United States Patent and Trademark Office, filed Jun. 29, 2021, 57 pages.

* cited by examiner

Primary Examiner — Ernesto A Suarez
Assistant Examiner — Lori Wu
(74) *Attorney, Agent, or Firm* — Hunton Andrews Kurth LLP (57) ABSTRACT

A vehicle parking lock mechanism includes a parking gear, a parking pawl, a lock member, and a support member. The parking pawl is meshed with the parking gear to hinder rotation of the parking gear. The lock member moves the parking pawl closer to the parking gear via a cam mechanism as the lock member is moved toward the locked position, to establish a parking locked state in which rotation of the parking gear is hindered by the parking pawl. The support member is provided with a guide portion guiding movement between a locked position and an unlocked position. The cam mechanism moves the parking pawl closer to the parking gear to be meshed therewith. A stopper is disposed on the lock member, to be engaged with the support member by taking a projecting posture in which the stopper projects toward the support member in the parking locked state.

8 Claims, 7 Drawing Sheets

VEHICLE PARKING LOCK MECHANISM

CROSS-REFERENCE TO RELATED APPLICATION

This application claims priority to Japanese Patent Application No. 2020-160232 filed on Sep. 24, 2020, incorporated herein by reference in its entirety.

BACKGROUND

1. Technical Field

The present disclosure relates to a vehicle parking lock mechanism, and in particular to a technique of suppressing "P-out" in which a parking pawl slips off from a parking gear when a vehicle is parked with a parking (P) range selected.

2. Description of Related Art

There is known a vehicle parking lock mechanism that includes a parking gear, a parking pawl, a lock member, and a support member such as that described below. The parking pawl is provided to be movable closer to and away from the parking gear, and meshed with the parking gear to hinder rotation of the parking gear. The lock member is disposed to be reciprocally movable between a locked position and an unlocked position. The lock member moves the parking pawl closer to the parking gear via a cam mechanism as the lock member is moved toward the locked position, to establish a parking locked state in which rotation of the parking gear is hindered by the parking pawl when the lock member is moved to the locked position. The support member is disposed on the opposite side of the lock member from the parking pawl, and provided with a guide portion that guides movement of the lock member between the locked position and the unlocked position while restricting displacement of the lock member toward the opposite side of the parking pawl. In the vehicle parking lock mechanism, the cam mechanism includes a cam roller disposed on the lock member to be rotatable about an axis at right angles to the direction of movement of the lock member, and a cam surface provided on the parking pawl to be engageable with the cam roller, the cam mechanism being configured such that the parking pawl is moved closer to the parking gear to be meshed with the parking gear by engaging the cam surface with the cam roller when the lock member is moved from the unlocked position to the locked position. Japanese Unexamined Patent Application Publication No. 2002-178891 describes an example of such a device, in which a sprag 2 corresponds to the parking pawl, a rod 4 provided with a pair of rollers 7 corresponds to the lock member, and a pressing member 3 corresponds to the support member.

In the vehicle parking lock mechanism, when a P range for parking is selected using a shift lever etc., wheels are locked not to be rotatable via a rotary shaft on which a parking gear is provided, by meshing the parking pawl with the parking gear by moving the lock member to the locked position. In that case, if the road surface gradient at the location at which the vehicle is parked is large, a push-out load that pushes the parking pawl off from the parking gear is generated in accordance with rotational torque applied to the parking gear by the weight of the vehicle. The push-out load moves the lock member back toward the unlocked position, which may cause P-out in which the parking pawl slips off from the parking gear. For example, if a lock-side engagement surface of a parking pawl to be engaged with a cam roller in a parking locked state is tilted in the direction of moving away from a guide member toward a parking unlocked position because of fluctuations in the dimensions of components etc., torque that rolls the cam roller toward the unlocked position is occasionally generated because of the inclination, and a force in the direction of moving back toward the unlocked position is occasionally applied to the lock member. In view of this, Japanese Unexamined Patent Application Publication No. 2018-141520 (JP 2018-141520 A) proposes providing a stopper (wedge restriction unit) to be advanceable to and retractable from a movement path for a lock member (wedge), the stopper being advanced and retracted in conjunction with a shift lever to suppress P-out by hindering backward movement of the lock member.

SUMMARY

In such a vehicle parking lock mechanism according to the related art, however, there has been a problem that the lock member is brought into abutment with the stopper, which projects to the movement path for the lock member, from a lateral direction, and therefore a bending load is applied to the stopper, which may increase the strength required for various portions including the stopper and increase the size of the device resulting in increasing the space in the vehicle for mounting the device etc.

The present disclosure is intended to suppress P-out when a vehicle is parked on a slope road while suppressing an increase in the size of the device.

An aspect of the present disclosure provides a vehicle parking lock mechanism including a parking gear, a parking pawl, and a support member. The parking pawl is provided to be movable closer to and away from the parking gear, and configured to be meshed with the parking gear to hinder rotation of the parking gear. The lock member is disposed to be reciprocally movable between a locked position and an unlocked position, the lock member being configured to move the parking pawl closer to the parking gear via a cam mechanism as the lock member is moved toward the locked position, to establish a parking locked state in which rotation of the parking gear is hindered by the parking pawl when the lock member is moved to the locked position. The support member is disposed on an opposite side of the lock member from the parking pawl, and provided with a guide portion that is configured to guide movement of the lock member between the locked position and the unlocked position while restricting displacement of the lock member toward the opposite side of the parking pawl. The cam mechanism includes a cam roller disposed on the lock member to be rotatable about an axis at right angles to a direction of movement of the lock member, and a cam surface provided on the parking pawl to be engageable with the cam roller, the cam mechanism being configured such that the parking pawl is moved closer to the parking gear to be meshed with the parking gear by engaging the cam surface with the cam roller when the lock member is moved from the unlocked position to the locked position. In the vehicle parking lock mechanism, the lock member includes a stopper disposed on the lock member to be turnable about a turning axis which is parallel to the axis of the cam roller and including a cylindrical outer peripheral surface to be brought into rolling contact with an outer peripheral surface of the cam roller, the stopper being turned about the turning axis along with rotation of the cam roller via the cylindrical outer peripheral surface as the lock member is moved from the unlocked position toward the locked position, to be engaged with the support member by taking a projecting posture in which the stopper projects toward the support member in the parking locked state.

In the vehicle parking lock mechanism according to the aspect described above, the stopper which is disposed on the lock member takes the projecting posture to project toward the support member in the parking locked state. Therefore, when a push-out load that pushes the parking pawl off from the parking gear is generated when the vehicle is parked on a slope road, and the push-out load is applied from the parking pawl to the cam roller, the stopper is pressed between the cam roller and the support member. Since variations in the posture of the stopper are restrained by the pressing force, rotation of the cam roller which is engaged with the cylindrical outer peripheral surface of the stopper is suppressed, torque of the cam roller in the direction of moving the lock member back toward the unlocked position is reduced, and P-out in which the parking pawl slips off from the parking gear as the lock member is moved back is suppressed. In that case, the stopper is pressed between the cam roller and the support member to receive a compressive load, and therefore the strength required for the stopper etc. is reduced compared to the case where a bending load is applied as in the related art, which enables a size reduction.

In the vehicle parking lock mechanism according to the aspect, a gap between the stopper and the support member may be equal to or less than a gap between the lock member and the guide portion, the stopper being in the projecting posture in the parking locked state.

According to the vehicle parking lock mechanism having the above configuration, the gap between the stopper, which is in the projecting posture in the parking locked state, and the support member is equal to or less than the gap between the lock member and the guide portion. Therefore, when a push-out load is applied to the cam roller, the stopper is reliably pressed between the cam roller and the support member, and the effect of suppressing P-out at the time when the vehicle is parked on a slope road is obtained appropriately.

In the vehicle parking lock mechanism according to the aspect, the stopper may be disposed on the lock member such that the turning axis and the axis of the cam roller are positioned on a line at right angles to the direction of movement of the lock member.

According to the vehicle parking lock mechanism having the above configuration, the turning axis of the stopper and the axis of the cam roller are positioned on a line at right angles to the direction of movement of the lock member. Therefore, the stopper is reliably pressed between the cam roller and the support member by a push-out load applied from the parking pawl to the cam roller, and the effect of suppressing P-out at the time when the vehicle is parked on a slope road is obtained appropriately.

In the vehicle parking lock mechanism according to the aspect, an engagement portion of the stopper in the projecting posture for engagement with the support member may include a portion on a side of the unlocked position with respect to the turning axis in the direction of movement of the lock member.

According to the vehicle parking lock mechanism having the above configuration, the engagement portion between the stopper, which is in the projecting posture in the parking locked state, and the support member includes a portion on the side of the unlocked position with respect to the turning axis of the stopper in the direction of movement of the lock member. Therefore, when a push-out load acts on the cam roller to bias the lock member toward the unlocked position, the turning axis of the stopper is displaced toward the parking pawl when the posture of the stopper is varied using the engagement portion on the side of the support member as the fulcrum. In that case, the lock member and the cam roller are pushed back toward the parking pawl through displacement of the turning axis. When a push-out load is applied to the parking pawl, however, a locked state is substantially established, and movement of the lock member toward the unlocked position is hindered to suppress P-out further appropriately.

According to the vehicle parking lock mechanism having the above configuration, an engagement surface on a side of the support member to be engaged with the stopper at the engagement portion may be inclined in a direction away from the turning axis toward the locked position with respect to a line that is parallel to the direction of movement of the lock member.

According to the vehicle parking lock mechanism having the above configuration, the engagement surface on the side of the support member to be engaged with the stopper is inclined in the direction away from the turning axis toward the locked position. Therefore, when a push-out load acts on the cam roller and the stopper is pressed against the support member, torque in the direction toward the locked position is generated in the turning axis of the stopper based on the inclination of the engagement surface of the support member, and a force in the direction toward the locked position is applied from the stopper to the lock member. Therefore, movement of the lock member toward the unlocked position is hindered to suppress P-out further appropriately.

According to the vehicle parking lock mechanism having the above configuration, an engagement surface on a side of the stopper to be engaged with the support member at the engagement portion may be inclined in a direction closer to the turning axis toward the locked position with respect to a line that is parallel to the direction of movement of the lock member.

According to the vehicle parking lock mechanism having the above configuration, the engagement surface on the side of the stopper to be engaged with the support member is inclined in the direction closer to the turning axis toward the locked position. Therefore, when a push-out load acts on the cam roller and the stopper is pressed against the support member, torque in the direction toward the locked position is generated in the turning axis of the stopper based on the inclination of the engagement surface of the support member, and a force in the direction toward the locked position is applied from the stopper to the lock member. Therefore, movement of the lock member toward the unlocked position is hindered to suppress P-out further appropriately.

In the vehicle parking lock mechanism according to the aspect, the outer peripheral surface of the cam roller may be provided with a fixing portion that projects toward the locked position in the parking locked state to be brought into contact with the parking pawl over a predetermined engagement length.

According to the vehicle parking lock mechanism having the above configuration, the outer peripheral surface of the cam roller is provided with a fixing portion, which is brought into contact with the parking pawl over a predetermined engagement length in the parking locked state. Therefore, when a push-out load is applied from the parking pawl to the cam roller when the vehicle is parked on a slope road, the fixing portion is relatively pressed against the parking pawl to cause sliding friction, and the rotational resistance is increased based on the sliding friction before the cam roller starts rolling. Consequently, a force in the direction of moving back toward the unlocked position applied to the lock member along with rolling of the cam roller is reduced, which further reliably suppresses P-out at the time when the vehicle is parked on a slope road in addition to the P-out suppression effect due to the stopper.

In the vehicle parking lock mechanism according to the aspect, the lock member may be provided with a guide roller to be engaged with the guide portion and rolled to rotate, when the lock member is moved between the locked position and the unlocked position, in order to restrict displacement of the lock member toward the opposite side of the parking pawl.

According to the vehicle parking lock mechanism having the above configuration, the guide roller, which is engaged with the guide portion and rolled to rotate to restrict displacement of the lock member toward the opposite side of the parking pawl, is disposed on the lock member, and the lock member is moved smoothly between the locked position and the unlocked position through rotation of the cam roller and the guide roller with the cam roller engaged with the cam surface and with the guide roller engaged with the guide portion. In this case, when a push-out load that pushes the parking pawl off from the parking gear is generated when the vehicle is parked on a slope road, the push-out load moves the lock member toward the unlocked position easily, which may cause P-out. Therefore, a conspicuous effect of suppressing P-out at the time when the vehicle is parked on a slope road according to the present disclosure is obtained by providing the stopper.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle parking lock mechanism according to the present disclosure is applied to a parking lock mechanism of a manual operation type in which a shift range is mechanically switched using a shift lever via an interlocking device such as a link and a cable, for example. However, the vehicle parking lock mechanism may also be applied to a parking lock mechanism of a shift-by-wire (SBW) type in which a shift range selected by a shift range selection device such as a shift lever is electrically established by a shift actuator of an electric type, a hydraulic type, etc. The shift range includes at least a parking (P) range in which power transfer is blocked and rotation of an output shaft is mechanically hindered. When the P range is selected, the parking lock mechanism is brought into a parking locked state. Besides the P range, the shift range includes a drive (D) range, which enables forward travel, a reverse (R) range, which enables rearward travel, etc., for example. The vehicle may be a variety of vehicles, such as an engine driven vehicle that generates power through combustion of fuel, an electric vehicle driven by an electric motor, and a hybrid vehicle that includes a plurality of power sources.

A parking gear is provided on a rotary shaft (such as an output shaft) rotated mechanically along with rotation of wheels. A parking pawl is meshed with the parking gear to mechanically hinder rotation of the rotary shaft and, further, rotation of the wheels. A lock member is disposed at the distal end portion of a parking rod, for example, and reciprocated between a locked position and an unlocked position together with the parking rod. The lock member can be moved back toward the unlocked position by a biasing device such as a spring member.

When a stopper is in a projecting posture in the parking locked state, rotational torque is applied to the parking gear by the weight of the vehicle on a slope road etc., and a push-out load that pushes the parking pawl off from the parking gear is generated. When the push-out load is applied from the parking pawl to a cam roller, at least a part of the push-out load may be transferred to a support member via the stopper. That is, even if there is a gap between the stopper and the support member before a push-out load is applied, the stopper may be brought into abutment with the support member through elastic deformation etc. of various portions before the lock member is moved back when the push-out load is applied. If the gap between the stopper and the support member in the parking locked state is equal to or less than a gap between the lock member and a guide portion, the stopper can be reliably caused to abut against the support member when a push-out load is applied. If the gap between the stopper and the support member is larger than the gap between the lock member and the guide portion, however, the stopper may be brought into abutment with the support member through elastic deformation etc. of various portions before the lock member is moved back.

The stopper is brought into a projecting posture when the lock member is moved from the unlocked position to the locked position by relatively rotating the stopper along with rotation of the cam roller, for example, and brought into a retracting posture, in which the stopper is disengaged from the support member and engagement between the lock member and the guide portion is allowed, when the lock member is moved from the locked position to the unlocked position. When there is a possibility that the stopper or the cam roller slips, the stopper may be turned about the turning axis using a biasing device such as a spring, or the support member may be provided with a guiding surface, an abutment surface, a link, etc. to be engaged with the stopper to vary the posture thereof, in order to reliably vary the posture of the stopper between the projecting posture and the retracted posture along with movement of the lock member.

The stopper and the cam roller are disposed to be rotatable to a certain arrangement position set on the lock member, for example. However, the cam roller may be disposed on the lock member to be displaceable in a direction at right angles to the direction of movement of the lock member so that the outer peripheral surface of the cam roller can be reliably brought into contact with the cylindrical outer peripheral surface of the stopper. A push-out load applied to the parking pawl in the parking locked state is transferred to the cam roller, and transferred from the cam roller to the support member via the stopper. However, a part of the push-out load applied to the cam roller may be transferred to the stopper via the lock member such as when both the stopper and the cam roller are disposed on the lock member at certain arrangement positions.

The stopper is disposed on the lock member such that the turning axis of the stopper and the axis of the cam roller are positioned on a line at right angles to the direction of movement of the lock member, for example. However, the turning axis of the stopper may be set to be displaced toward the locked position, or toward the unlocked position, with respect to the axis of the cam roller. If the turning axis of the stopper is displaced toward the locked position with respect to the axis of the cam roller, for example, torque in the direction of rolling toward the locked position is generated in the cam roller because of the deviation between the respective axes of the stopper and the cam roller when the cam roller is pressed against the stopper based on the push-out load, which further reliably suppresses P-out at the time when the vehicle is parked on a slope road.

An engagement portion between the stopper in the projecting posture in the parking locked state and the support member is determined to include the same position as the turning axis in the direction of movement of the lock member, for example. However, it is desirable that the engagement portion should include a portion on the side of the unlocked position with respect to the turning axis. In addition, respective engagement surfaces of the stopper and the support member at the engagement portion therebetween are determined to be parallel to the direction of movement of the lock member, for example. However, a variety of aspects are possible. For example, the engagement surface on the side of the support member at the engagement portion may be inclined in a direction away from the turning axis toward the locked position, or conversely the engagement surface on the side of the stopper may be inclined in a direction closer to the turning axis toward the locked position, or the engagement surfaces of both the stopper and the support member may be inclined.

The outer peripheral surface of the cam roller may be provided with a fixing portion projected in the direction of the locked position in the parking locked state to be brought into contact with the parking pawl over a predetermined engagement length, for example. However, the outer peripheral surface of the cam roller may be a cylindrical surface centered about the axis over the entire periphery. In addition, the lock member is provided with a guide roller to be engaged with the guide portion and rolled to rotate, when the lock member is moved between the locked position and the unlocked position, in order to restrict displacement of the lock member toward the opposite side of the parking pawl. However, a guide roller may not be provided, and a part of the lock member may be brought into sliding contact with the guide portion. The guide roller may be provided at a desired position on the lock member. However, the guide roller may be provided integrally with the stopper, for example.

Embodiments of the present disclosure will be described in detail below with reference to the drawings. In the following embodiments, the drawings are simplified or deformed as appropriate for illustration, and the dimensional ratios, shapes, etc. of various portions are not necessarily exact.

Figure 1:
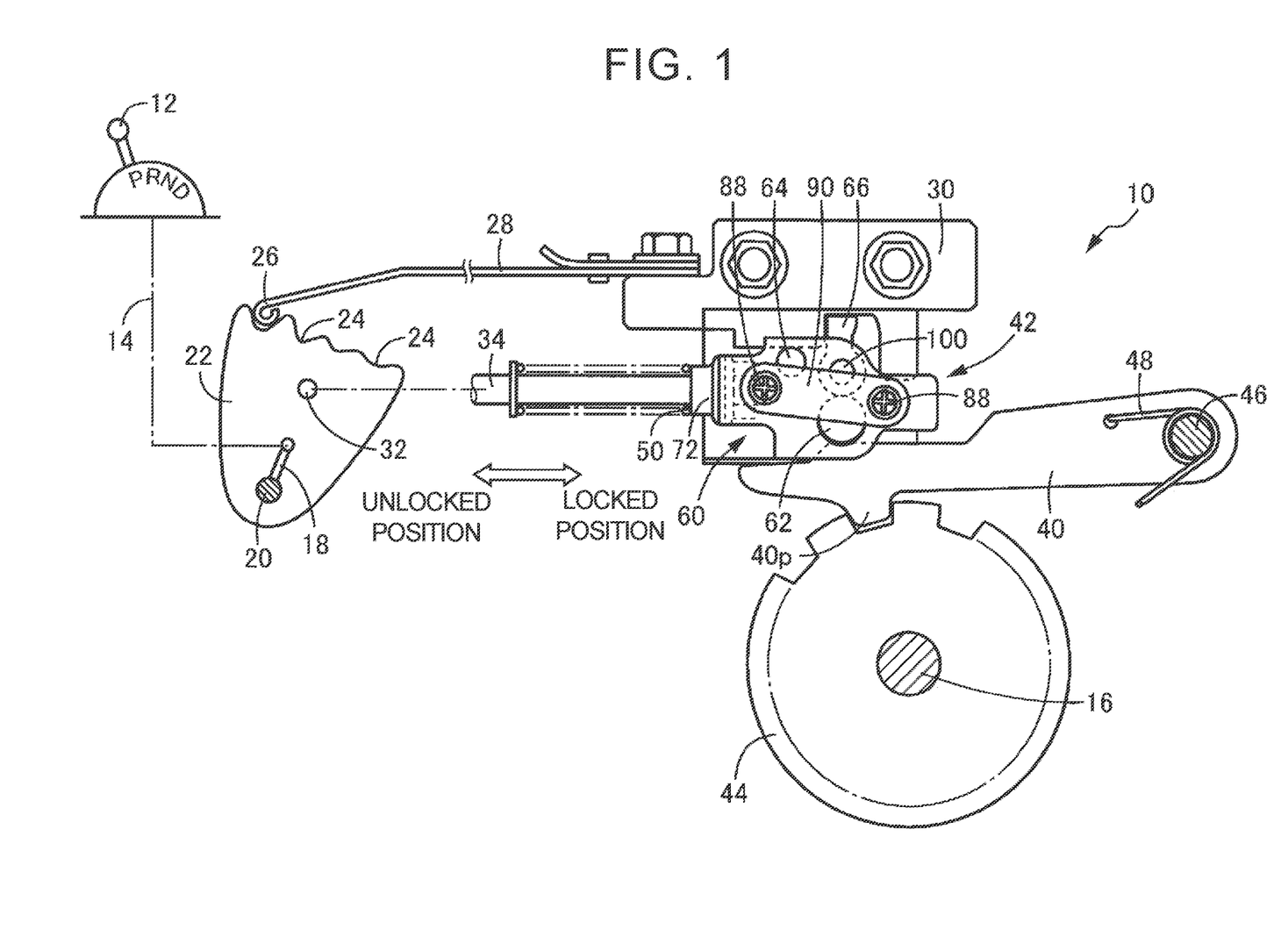
FIG. 1 is a diagram illustrating a schematic configuration of a vehicle parking lock mechanism according to a first embodiment of the present disclosure in a parking locked state.

FIG. 1 is a diagram illustrating a schematic configuration of a vehicle parking lock mechanism 10 according to a first embodiment as an example of the present disclosure. The vehicle parking lock mechanism 10 is a parking lock mechanism of a manual operation type in which the shift range is mechanically switched using a shift lever 12 via an interlocking device 14 such as a link or a push-pull cable. The shift lever 12 is disposed in the vicinity of a driver's seat, and turned to four positions, namely a parking (P) position, a reverse (R) position, a neutral (N) position, and a drive (D) position, in accordance with a shift operation by a driver. The P position is a shift operation position for selecting a P range for parking, in which power transfer is blocked and rotation of an output shaft 16 of an automatic transmission is mechanically hindered. The R position is a shift operation position for selecting an R range that enables rearward travel. The N position is a shift operation position for selecting an N range in which power transfer is blocked. The D position is a shift operation position for selecting a D range which enables forward travel.

The shift lever 12 is coupled to an outer lever 18 via the interlocking device 14. The outer lever 18 is fixed to a manual shaft 20. A detent plate 22 is secured to the manual shaft 20. Thus, the detent plate 22 is turned about the axis of the manual shaft 20 in accordance with the shift operation position of the shift lever 12, and positioned at four turning positions, namely the D position, the R position, the N position, and the D position. Recesses and projections having four positioning recesses 24 are provided at the distal end portion of the detent plate 22 to allow a retention portion 26 to be engaged with the positioning recesses 24. The retention portion 26 is formed by curling the distal end portion of a plate spring 28, and displaced in accordance with the recessed and projecting shape through elastic deformation of the plate spring 28, and applies predetermined moderation (positioning force) to the detent plate 22 at each of the P, R, N, and D turning positions. The plate spring 28 is attached to a support member 30 secured to a transmission case etc. In FIG. 1, the shift lever 12 is operated to the P position, and the detent plate 22 is mechanically turned clockwise about the manual shaft 20 to be held at the P position.

The detent plate 22 is provided with a coupling hole 32. A parking rod 34 is relatively turnably coupled to the coupling hole 32. The parking rod 34 is reciprocated generally linearly in the longitudinal direction of the parking rod 34, that is, in the right-left direction in FIG. 1, along with turning of the detent plate 22 to be moved to a locked position, which is in the right direction in FIG. 1, and an unlocked position, which is in the left direction. At the locked position, as illustrated in FIG. 1, the shift lever 12 is operated to the P position, and the detent plate 22 is turned clockwise to the P position about the manual shaft 20. At the unlocked position, the shift lever 12 is operated to a non-P position such as the R position, and the detent plate 22 is turned counterclockwise about the manual shaft 20 to a non-P position such as the R position. In the first embodiment, a play mechanism is provided between the shift lever 12 and the parking rod 34 so that the parking rod 34 is constantly held at the unlocked position when the shift lever 12 is at a non-P position including the R to D positions. In other words, the parking rod 34 is brought to the locked position, which is in the right direction in FIG. 1, when the shift lever 12 is operated to the P position, and the parking rod 34 is brought to the unlocked position, which is in the left direction in FIG. 1, when the shift lever 12 is operated to the R position. When the shift lever 12 is operated among the non-P positions including the R to D positions, meanwhile, the parking rod 34 is constantly held at the unlocked position irrespective of the shift operation.

A lock member 42 to be engaged with a parking pawl 40 is disposed at the distal end portion of the parking rod 34. When the lock member 42 is moved to the locked position together with the parking rod 34, the parking pawl 40 is turned downward in FIG. 1, and a meshing cog 40p is meshed with a parking gear 44. The parking gear 44 is attached to the output shaft 16 of the automatic transmission to be relatively non-rotatable. The parking pawl 40 is disposed on a transmission case etc. to be turnable about the axis of a pawl shaft 46 that is parallel to the output shaft 16, and biased in an unmeshing direction (clockwise direction in FIG. 1) by a return spring 48 as a biasing device. The lock member 42 turns the parking pawl 40 in a meshing direction (counterclockwise direction in FIG. 1) against the biasing force of the return spring 48. That is, the parking pawl 40 is disposed such that the meshing cog 40p is movable closer to and away from the parking gear 44. When the parking pawl 40 is turned in the meshing direction or downward in FIG. 1 by the lock member 42, the meshing cog 40p is moved closer to the parking gear 44 to be meshed therewith, which establishes a parking locked state in which rotation of the parking gear 44 and, further, rotation of the output shaft 16 and the wheels are mechanically hindered. FIG. 1 illustrates the parking locked state.

The lock member 42 is biased toward the distal end side of the parking rod 34 by a spring member (a compression coil spring in the first embodiment) 50 as a biasing device, and held at the distal end position on the side of the locked position to turn the parking pawl 40 in the meshing direction. When the parking pawl 40 and the parking gear 44 interfere with each other, however, the lock member 42 is allowed to be relatively moved back in the direction of the unlocked position with respect to the parking rod 34 against the biasing force of the spring member 50. The lock member 42 is supported by the support member 30 to be movable linearly and reciprocally between the locked position and the unlocked position with predetermined play, that is, in the state of being displaceable, in a direction (up-down direction in FIG. 1) at right angles to the direction of movement. In addition, the manual shaft 20 is disposed on the opposite side of the output shaft 16 from the pawl shaft 46 in the posture of being parallel to the output shaft 16, and the lock member 42 is movable closer to the parking pawl 40 from the distal end side (left side in FIG. 1) of the parking pawl 40.

Figure 2:
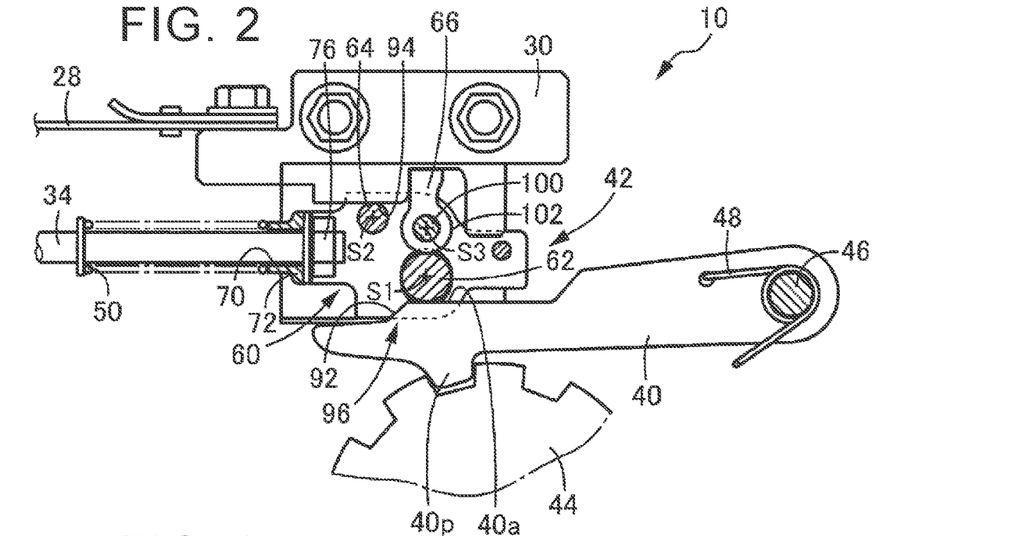
FIG. 2 is a front view illustrating, as partially cut away, a portion of the vehicle parking lock mechanism in FIG. 1 in the vicinity of a lock member.
Figure 3:
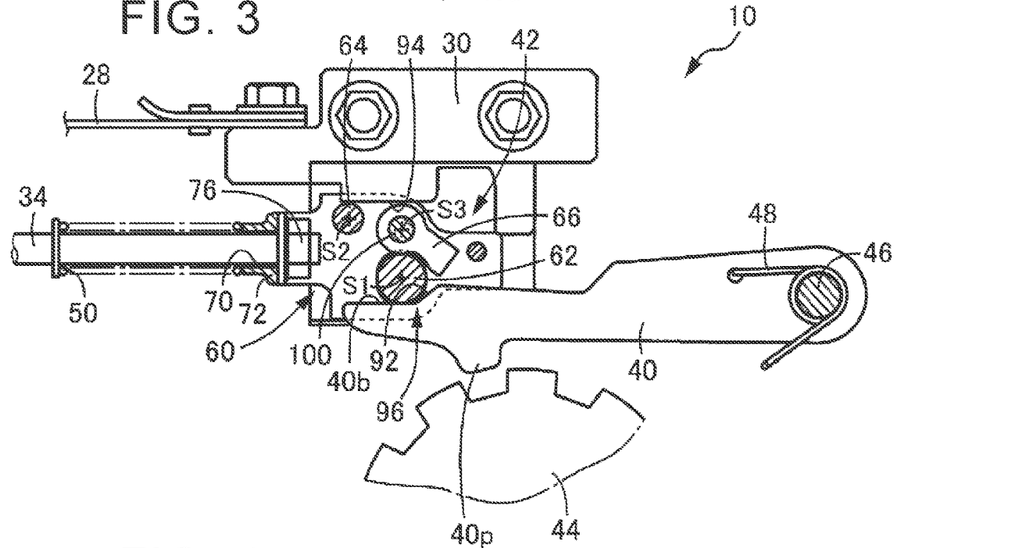
FIG. 3 is a front view, corresponding to FIG. 2, illustrating the vehicle parking lock mechanism in FIG. 1 in an unlocked state.

FIGS. 2 and 3 are each a front view illustrating, as partially cut away, the lock member 42 and a portion in the vicinity thereof in detail. FIG. 2 illustrates the same, parking locked state as in FIG. 1. FIG. 3 illustrates the unlocked state in which the lock member 42 is moved to the unlocked position and meshing between the parking pawl 40 and the parking gear 44 is released. In the drawings, the lock member 42 is configured to include a coupling head 60, a cam roller 62, a guide roller 64, and a stopper 66.

Figure 4:
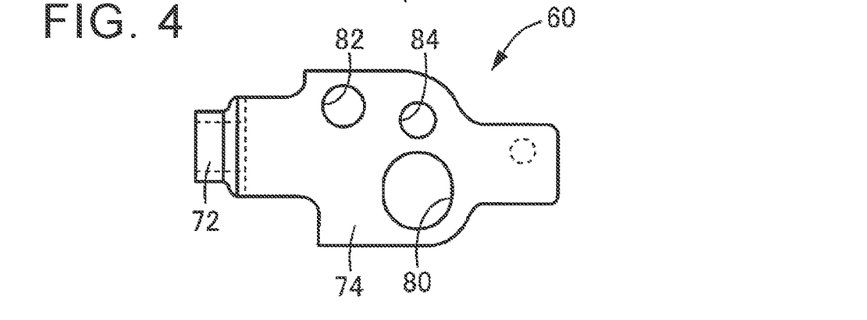
FIG. 4 is a front view illustrating a coupling head, alone, of the lock member of the vehicle parking lock mechanism in FIG. 1.
Figure 5:
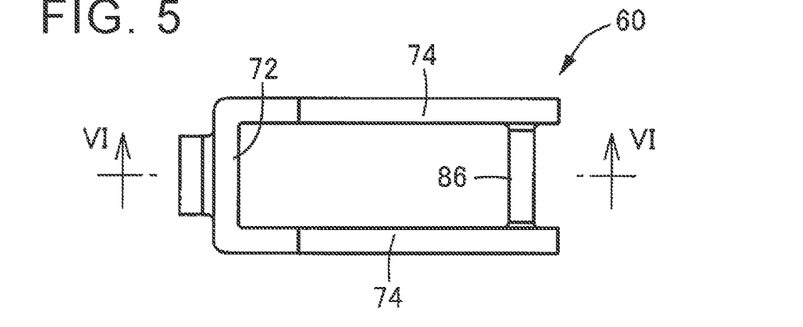
FIG. 5 is a plan view of the coupling head in FIG. 4.
Figure 6:
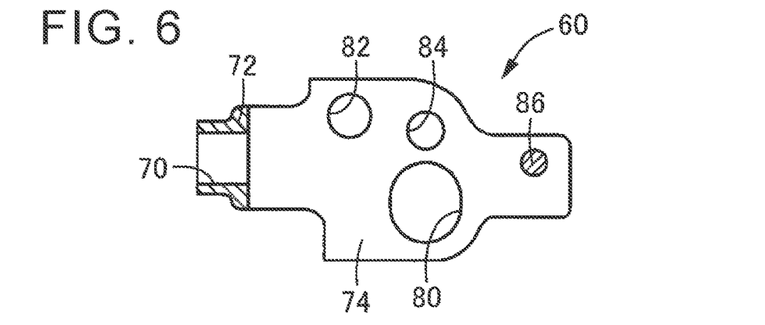
FIG. 6 is a sectional view taken along a line VI-VI in FIG. 5.

FIG. 4 is a front view illustrating the coupling head 60 alone. FIG. 5 is a plan view of the coupling head 60. FIG. 6 is a sectional view taken along a line VI-VI in FIG. 5. The coupling head 60 includes a coupling portion 72 bifurcated to be in a generally U-shape and provided with an insertion hole 70 through which the parking rod 34 is inserted, and a pair of side wall portions 74 that extend in parallel with each other in the axial direction of the insertion hole 70 from both ends of the coupling portion 72. As illustrated in FIGS. 2 and 3, the parking rod 34 is inserted through the insertion hole 70 to be relatively movable in the axial direction. A nut 76 is secured to the distal end portion of the parking rod 34 that projects into the coupling head 60 from the insertion hole 70. The spring member 50 is retained at the peripheral edge portion of the insertion hole 70. Thus, the coupling head 60 is normally held at the distal end position of the parking rod 34, at which the coupling portion 72 is brought into abutment with the nut 76 in accordance with the biasing force of the spring member 50, and allowed to be moved away from the nut 76 against the biasing force of the spring member 50 to be relatively moved back in the direction of the unlocked position with respect to the parking rod 34.

The coupling head 60 is held by the support member 30 in such a posture that the side wall portions 74 are perpendicular to the axis of the output shaft 16, that is, in such a posture that the side wall portions 74 are positioned in parallel with the sheet surface of FIGS. 1 to 3 and away from each other in the front-back direction of the sheet surface. The side wall portions 74 are each provided with a cam roller attachment hole 80, a guide roller attachment hole 82, and a stopper attachment hole 84 at the same position. A reinforcement coupling portion 86 is provided at the distal end portion of the side wall portions 74 on the opposite side of the coupling portion 72.

The cam roller attachment hole 80 is a long hole that is long in a direction at right angles to the longitudinal direction of the side wall portions 74, that is, in the up-down direction which is at right angles to the direction of movement of the lock member 42, and holds the cam roller 62 in the posture of being generally parallel to the output shaft 16 with predetermined play in the up-down direction as illustrated in FIGS. 2 and 3. That is, both end portions of the cam roller 62 are supported by the cam roller attachment holes 80 of the side wall portions 74 with the cam roller 62 rotatable about an axis S1 which is at right angles to the direction of movement of the lock member 42. The guide roller attachment hole 82 is provided at a position displaced toward the upper side and toward the coupling portion 72, that is, toward the unlocked position, with respect to the cam roller attachment hole 80, and holds the guide roller 64 in the posture of being generally parallel to the output shaft 16 as illustrated in FIGS. 2 and 3. That is, both end portions of the guide roller 64 are supported by the guide roller attachment holes 82 of the side wall portions 74 with the guide roller 64 rotatable about an axis S2 which is at right angles to the direction of movement of the lock member 42. The stopper attachment hole 84 is provided at a position above the cam roller attachment hole 80, and holds the stopper 66 to be turnable about a turning axis S3, which is at right angles to the direction of movement of the lock member 42, via an attachment pin 100 as illustrated in FIGS. 2 and 3. That is, the attachment pin 100 projects to both side portions of the stopper 66, and the both side portions are inserted into the stopper attachment holes 84 of the side wall portions 74 to be supported so that the stopper 66 is held to be turnable about the turning axis S3, which is parallel to the output shaft 16, between the side wall portions 74. The stopper 66 may be attached to be turnable with respect to the attachment pin 100, or the attachment pin 100 may be attached to be turnable with respect to the side wall portions 74. Dropping of the cam roller 62, the guide roller 64, and the attachment pin 100 of the stopper 66 from the coupling head 60 is suppressed by a pair of push plates 90 (see FIG. 1) attached using screws 88 so as to tightly contact the outer side surfaces of the side wall portions 74. The cam roller 62 and the guide roller 64 may also be disposed on the coupling head 60 via an attachment pin, as with the stopper 66.

The cam roller 62 is engaged with the parking pawl 40 and rolled to rotate, when the lock member 42 is moved from the unlocked position to the locked position, to move the parking pawl 40 closer to the parking gear 44 to be meshed therewith. The parking pawl 40 is provided with a cam surface (an inclined surface in the first embodiment) 92 to be engaged with the cam roller 62 to turn the parking pawl 40 in the meshing direction. Meanwhile, the guide roller 64 is engaged with a guide portion 94, which is provided on the support member 30, and rolled to rotate, when the lock member 42 is moved between the locked position and the unlocked position, in order to restrict displacement of the lock member 42 toward the opposite side of the parking pawl 40. The guide portion 94 is provided in parallel (right-left direction in FIGS. 1 to 3) with the direction of movement of the lock member 42 on the opposite side of the lock member 42 from the parking pawl 40, and guides the lock member 42 via the guide roller 64 so as to reciprocate generally linearly between the locked position and the unlocked position while restricting displacement of the lock member 42 toward the opposite side of the parking pawl 40. In the first embodiment, the guide roller 64 is smaller in diameter than the cam roller 62. However, the diameter of the guide roller 64 may be determined as desired.

Consequently, when the lock member 42 is moved from the unlocked position to the locked position, the cam roller 62 and the guide roller 64 are engaged with the parking pawl 40 and the guide portion 94, respectively, and rolled to rotate about the axes S1, S2, respectively, which allows the parking pawl 40 to be turned in the meshing direction through engagement between the cam roller 62 and the cam surface 92 and meshed with the parking gear 44 while restricting displacement of the lock member 42 toward the opposite side of the parking pawl 40. In the parking locked state in which the lock member 42 is moved to the locked position, the cam roller 62 is engaged with a lock-side engagement surface 40a (see FIG. 2), which is provided on the parking pawl 40 so as to extend in parallel with the direction of movement of the lock member 42, and the cam roller 62 and the guide roller 64 are interposed between the lock-side engagement surface 40a and the guide portion 94, both of which are provided in parallel with the direction of movement of the lock member 42. Consequently, the parking locked state is maintained stably with the rolling resistance of the cam roller 62 and the guide roller 64. In the first embodiment, a cam mechanism 96 which includes the cam roller 62 and the cam surface 92 and in which the parking pawl 40 is moved closer to the parking gear 44 to be meshed therewith is constituted.

When rotational torque is applied to the parking gear 44 because of the weight of the vehicle when the vehicle is parked on a slope road, a push-out load that pushes the parking pawl 40 off from the parking gear 44 is generated in accordance with the rotational torque. When such a push-out load is applied from the parking pawl 40 to the cam roller 62, the lock member 42 is moved back toward the unlocked position even in the parking locked state which is maintained relatively stably, which may cause P-out in which the meshing cog 40p of the parking pawl 40 slips off from the parking gear 44. For example, if the lock-side engagement surface 40a of the parking pawl 40 to be engaged with the cam roller 62 is tilted in the direction of moving away from the guide portion 94 toward the unlocked position because of fluctuations in the dimensions of components etc., torque that rolls the cam roller 62 toward the unlocked position is occasionally generated because of the inclination, and a force in the direction of moving back toward the unlocked position is occasionally applied to the lock member 42.

Figure 7:
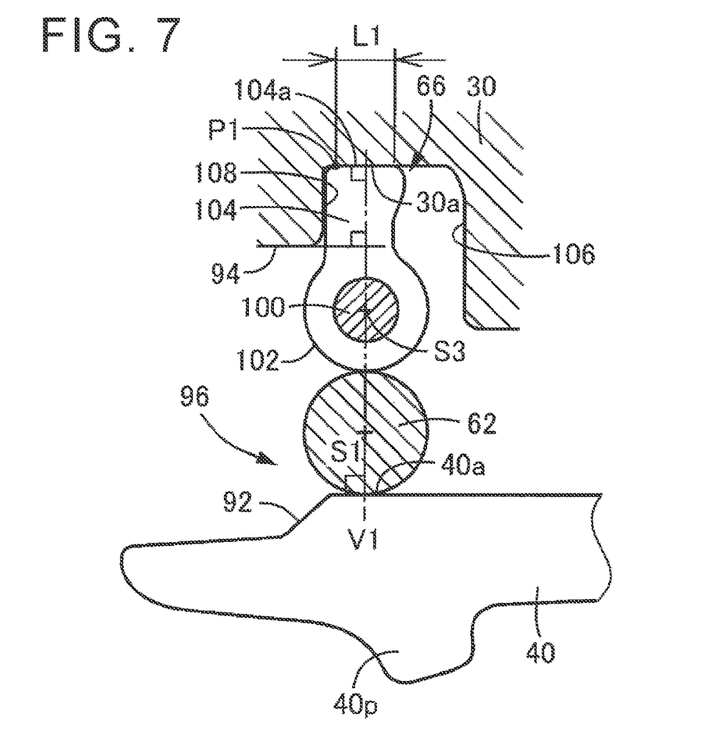
FIG. 7 illustrates a stopper, in a projecting posture, provided on the lock member of the vehicle parking lock mechanism in FIG. 1, illustrating a state in which the stopper is engaged with a support member.

In the present embodiment, in view of this, P-out is suppressed by the stopper 66 which is provided on the lock member 42. As illustrated as enlarged in FIG. 7, the stopper 66 is disposed on the lock member 42 such that the turning axis S3 of the stopper 66 and the axis S1 of the cam roller 62 are positioned on a vertical line V1 which is at right angles to an extension line of the guide portion 94 which extends in the direction of movement of the lock member 42. That is, the respective center points of the cam roller attachment hole 80 and the stopper attachment hole 84 that are provided in the coupling head 60 are set so as to be positioned on the vertical line V1. In addition, the stopper 66 includes a cylindrical outer peripheral surface 102 to be brought into rolling contact with the outer peripheral surface of the cam roller 62, and a projecting portion 104 that projects in the opposite direction of the cylindrical outer peripheral surface 102 about the turning axis S3. When the lock member 42 is moved between the unlocked position and the locked position, the stopper 66 is turned about the turning axis S3 along with rotation of the cam roller 62 via the cylindrical outer peripheral surface 102, to be varied in the posture between a projecting posture illustrated in FIG. 2 and a retracted posture illustrated in FIG. 3. FIG. 7 illustrates the same, parking locked state as in FIG. 2, in which the stopper 66 is in the projecting posture in which the projecting portion 104 projects toward the support member 30. The cylindrical outer peripheral surface 102 is a cylindrical surface centered on the turning axis S3, and is provided for a predetermined angular range (about 280° in the first embodiment) excluding the projecting portion 104. In the first embodiment, the radius of the cylindrical outer peripheral surface 102 is generally equal to the radius of the cam roller 62. However, the radius of the cylindrical outer peripheral surface 102 may be determined, as appropriate, in accordance with the projecting posture and the retracted posture, for example.

When the stopper 66 is in the projecting posture, a flat engagement surface 104a provided at the distal end portion of the projecting portion 104 is brought into abutment so as to tightly contact a flat engagement surface 30a provided on the support member 30, and the engagement surfaces 30a, 104a are at right angles to the vertical line V1. The engagement surface 30a is a flat surface that is parallel to the guide portion 94, that is, parallel to the direction of movement of the lock member 42, and is caused to tightly contact the engagement surface 104a in an engagement range L1 including both sides of the vertical line V1, which passes through the turning axis S3, in the direction of movement of the lock member 42. The engagement range L1 is determined appropriately in advance through an experiment etc. such that a targeted P-out suppression effect is obtained and P-out operation is performed appropriately along with a shift operation of the shift lever 12. The stopper 66 has a width (about 12 mm in the first embodiment) that is slightly smaller than the inside dimension of the side wall portions 74 of the coupling head 60. The engagement surfaces 30a, 104a are each a rectangular flat surface. The shape of the distal end portion of the stopper 66 is changeable, as appropriate, as long as the required strength is obtained such as a hemispherical shape, which allows the stopper 66 to make generally point contact with the support member 30, or a semi-cylindrical shape with a semicircular sectional shape, which allows the stopper 66 to make parallel line contact with the support member 30 in parallel with the turning axis S3. The engagement surface 30a on the side of the support member 30 may have a hemispherical shape or a semi-cylindrical shape.

In order for the stopper 66 to be brought into the projecting posture in the parking locked state in FIG. 7, the support member 30 is provided with a stopper guiding surface 106 on the side of the locked position with respect to the engagement surface 104a, and a stopper abutment surface 108 on the side of the unlocked position with respect to the engagement surface 104a. That is, the stopper 66 is turned about the turning axis S3 along with rotation of the cam roller 62, and there is a possibility of a deviation in the rotational phase due to slipping etc. Therefore, if rotation of the stopper 66 is delayed when the lock member 42 is moved from the unlocked position toward the locked position, the stopper 66 is turned counterclockwise in FIG. 7 by the stopper guiding surface 106 so that the stopper 66 is reliably brought into abutment with the stopper abutment surface 108 to take the projecting posture when the lock member 42 is moved to the locked position. If rotation of the stopper 66 is advanced, meanwhile, the stopper 66 is brought into abutment with the stopper abutment surface 108 to be held in the projecting posture when the lock member 42 is moved to the locked position. A biasing device such as a torsion coil spring or a plate spring may be provided to bias and turn the stopper 66 in the counterclockwise direction about the attachment pin 100.

The dimension, arrangement position, etc. of the stopper 66 are determined such that the gap between the engagement surface 104a and the engagement surface 30a is equal to or less than the gap between the guide roller 64 and the guide portion 94, and both of the gaps are generally zero in the first embodiment, when no push-out load is applied, so that the engagement surface 104a and the engagement surface 30a are engaged with each other before the lock member 42 is moved back toward the unlocked position when a push-out load directed upward in FIG. 7 is applied to the cam roller 62 from the parking pawl 40 on a slope road etc. In this case, when a push-out load is applied to the parking pawl 40 on a slope road etc., the stopper 66 is pressed between the cam roller 62 and the support member 30 with the engagement surface 104a and the engagement surface 30a engaged with each other before the lock member 42 is moved back toward the unlocked position, and variations in the posture of the stopper 66 (turning about the turning axis S3) are restrained by the pressing force. In the first embodiment, the engagement surface 104a and the engagement surface 30a are brought into surface contact in a posture at right angles to the vertical line V1, and therefore the posture of the stopper 66 is stable, which suppresses turning of the stopper 66 to any direction. Therefore, rotation of the cam roller 62 which is engaged with the cylindrical outer peripheral surface 102 of the stopper 66 is suppressed, and torque in the direction of rolling toward the unlocked position generated in the cam roller 62 by the push-out load, that is, torque of the cam roller 62 in the direction of moving the lock member 42 back toward the unlocked position, is reduced, and P-out in which the parking pawl 40 slips off from the parking gear 44 as the lock member 42 is moved back is suppressed.

The stopper 66 in the projecting posture and the support member 30 are engaged with each other in the engagement range L1 which includes both sides of the vertical line V1, which passes through the turning axis S3, in the direction of movement of the lock member 42, and include a portion on the side of the unlocked position with respect to the turning axis S3. Therefore, when a push-out load acts on the cam roller 62 and a force in the direction of moving back toward the unlocked position is applied to the lock member 42, the posture of the stopper 66 is varied using an engagement point P1, which is in the engagement range L1 and on the side of the unlocked position, as the fulcrum, and the attachment pin 100 is turned in the lower left direction in FIG. 7 about the engagement point P1. That is, a force in the direction of pushing back toward the parking pawl 40 is applied to the lock member 42 via the attachment pin 100 so that the lock member 42 is substantially locked with the push-out load applied from the parking pawl 40, and movement of the lock member 42 toward the unlocked position is hindered to suppress P-out further appropriately. In the first embodiment, the engagement range L1 corresponds to the engagement portion.

When the lock member 42 is moved from the locked position to the unlocked position, on the other hand, the stopper 66 is turned about the turning axis S3 along with rotation of the cam roller 62 via the cylindrical outer peripheral surface 102, to take the retracted posture. In the retracted posture, the engagement surface 104a is moved away from the engagement surface 30a, the guide portion 94 can guide the lock member 42, and the guide roller 64 can be reliably brought into contact with the guide portion 94. The retracted posture is not limited to the posture of the stopper 66 at the unlocked position in FIG. 3. FIG. 3 corresponds to the unlocked state in which the lock member 42 is moved to the unlocked position and meshing between the parking pawl 40 and the parking gear 44 is released, and in which the cam roller 62 is engaged with an unlock-side engagement surface 40b, which is generally parallel to the direction of movement of the lock member 42, after passing through the cam surface 92. Even if slipping occurs between the stopper 66 and the cam roller 62, or between the cam roller 62 and the parking pawl 40, when the lock member 42 is moved toward the unlocked position, the posture of the stopper 66 is varied such that the stopper 66 rides onto the guide portion 94 along with movement of the lock member 42, and the stopper 66 takes the retracted posture in which the guide roller 64 can be brought into contact with the guide portion 94. The guide portion 94 also functions as a posture conversion portion that varies the posture of the stopper 66.

In the vehicle parking lock mechanism 10 according to the first embodiment, in this manner, the stopper 66 which is disposed on the lock member 42 takes the projecting posture to project toward the support member 30 in the parking locked state. Therefore, when a push-out load that pushes the parking pawl 40 off from the parking gear 44 is generated when the vehicle is parked on a slope road, and the push-out load is applied from the parking pawl 40 to the cam roller 62, the stopper 66 is pressed between the cam roller 62 and the support member 30. Since variations in the posture of the stopper 66 are restrained by the pressing force, rotation of the cam roller 62 which is engaged with the cylindrical outer peripheral surface 102 of the stopper 66 is suppressed, torque of the cam roller 62 in the direction of moving the lock member 42 back toward the unlocked position is reduced, and P-out in which the parking pawl 40 slips off from the parking gear 44 as the lock member 42 is moved back is suppressed. In that case, the stopper 66 is pressed between the cam roller 62 and the support member 30 to receive a compressive load, and therefore the strength required for the stopper 66 and the lock member 42 is reduced compared to the case where a bending load is applied as in the related art, which enables a reduction in the size and the weight of such components.

The range L1 of engagement between the stopper 66, which is in the projecting posture in the parking locked state, and the support member 30 includes a portion (engagement point P1) on the side of the unlocked position with respect to the turning axis S3 of the stopper 66 in the direction of movement of the lock member 42. Therefore, when a push-out load acts on the cam roller 62 to bias the lock member 42 toward the unlocked position, the turning axis S3 of the stopper 66 is displaced toward the parking pawl 40 when the posture of the stopper 66 is varied using the engagement point P1 as the fulcrum. The displacement of the turning axis S3 pushes back the lock member 42 and the cam roller 62 toward the parking pawl 40, and the lock member 42 is substantially locked with the push-out load applied from the parking pawl 40, and movement of the lock member 42 toward the unlocked position is hindered to suppress P-out further appropriately.

The gap between the stopper 66, which is in the projecting posture in the parking locked state, and the support member 30, that is, the gap between the engagement surface 104a and the engagement surface 30a, is equal to or less than the gap between the guide roller 64 of the lock member 42 and the guide portion 94, and both the gaps are generally zero in the first embodiment. Therefore, when a push-out load is applied to the cam roller 62, the stopper 66 is reliably pressed between the cam roller 62 and the support member 30, and the effect of suppressing P-out at the time when the vehicle is parked on a slope road is obtained appropriately.

The turning axis S3 of the stopper 66 and the axis S1 of the cam roller 62 are positioned on the vertical line V1 that is at right angles to the direction of movement of the lock member 42. Therefore, the stopper 66 is reliably pressed between the cam roller 62 and the support member 30 by a push-out load applied from the parking pawl 40 to the cam roller 62, and the effect of suppressing P-out at the time when the vehicle is parked on a slope road is obtained appropriately.

The guide roller 64, which is engaged with the guide portion 94 and rolled to rotate to restrict displacement of the lock member 42 toward the opposite side of the parking pawl 40, is disposed on the lock member 42. Therefore, the lock member 42 is moved smoothly between the locked position and the unlocked position through rotation of the cam roller 62 and the guide roller 64 with the cam roller 62 engaged with the cam surface 92 and with the guide roller 64 engaged with the guide portion 94. In this case, when a push-out load that pushes the parking pawl 40 off from the parking gear 44 is generated when the vehicle is parked on a slope road, the push-out load moves the lock member 42 toward the unlocked position easily, which may cause P-out. Therefore, a conspicuous effect of suppressing P-out at the time when the vehicle is parked on a slope road is obtained by providing the stopper 66.

Next, modifications of the first embodiment of the present disclosure will be described. In the following modifications, portions that are substantially the same as those according to the first embodiment are given the same reference signs to omit detailed description.

Figure 8:
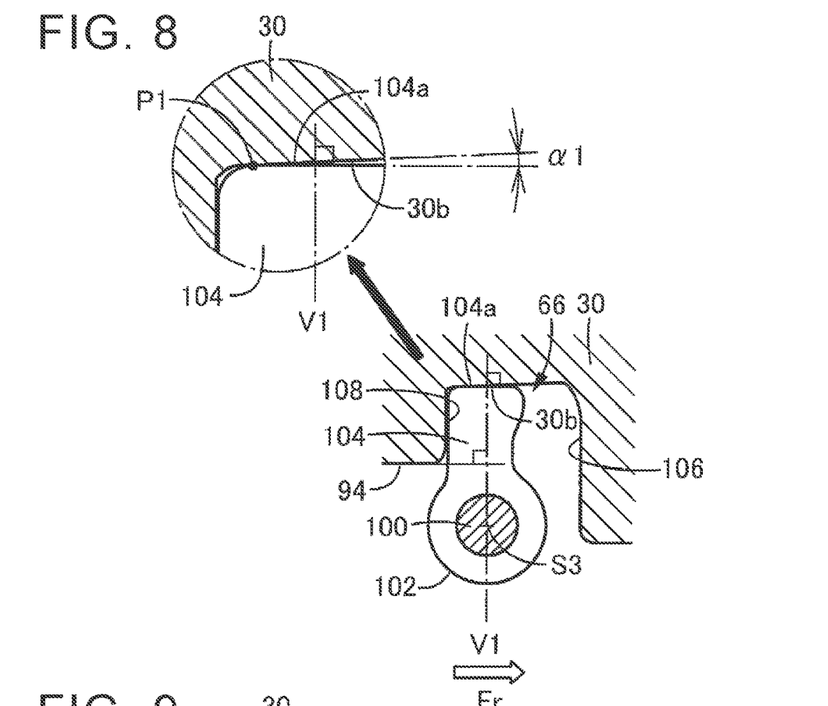
FIG. 8 illustrates the manner of engagement between the stopper and the support member according to a first modification of the first embodiment, including an enlarged view of the engagement portion.

FIG. 8 illustrates a portion in the vicinity of the stopper 66 in the parking locked state according to a first modification of the first embodiment, also illustrating an enlarged view of an engagement portion between the stopper 66 and the support member 30. An engagement surface 30b provided on the support member 30 is different from the engagement surface 30a according to the first embodiment. The engagement surface 30b is inclined by an angle α1 in the direction away from the turning axis S3 toward the locked position, which is in the right direction in FIG. 8, with respect to a line that is parallel to the direction of movement of the lock member 42, that is, a line that is parallel to the guide portion 94. The angle α1 is in the range of about 0.5° to 2°, for example, and is about 1° in the first modification. The engagement surface 104a of the stopper 66 to be engaged with the engagement surface 30b is parallel to the direction of movement of the lock member 42 when the stopper 66 is in the projecting posture, and is engaged with the engagement surface 30b of the support member 30 at only the engagement point P1, which is on the side of the unlocked position with respect to the turning axis S3. In the first modification, the engagement point P1 serves as the engagement portion.

With the first modification, the same function and effect as those of the first embodiment can be obtained. That is, when the stopper 66 is pressed between the cam roller 62 and the support member 30 because of a push-out load, variations in the posture of the stopper 66 are restrained and rotation of the cam roller 62 is suppressed, and torque in the direction of rolling toward the unlocked position generated in the cam roller 62 by the push-out load is reduced to suppress P-out. Additionally, the engagement surface 30b of the support member 30 is inclined in the direction away from the turning axis S3 toward the locked position. Therefore, when a push-out load acts on the cam roller 62 and the stopper 66 is pressed against the support member 30, torque in the direction (counterclockwise direction in FIG. 8) in which the turning axis S3 of the stopper 66 is moved toward the locked position about the engagement point P1 is generated based on the inclination of the engagement surface 30b of the support member 30, and a force Fr in the direction toward the locked position is applied to the lock member 42 via the attachment pin 100 of the stopper 66. Therefore, movement of the lock member 42 toward the unlocked position is hindered to suppress P-out further appropriately.

Figure 9:
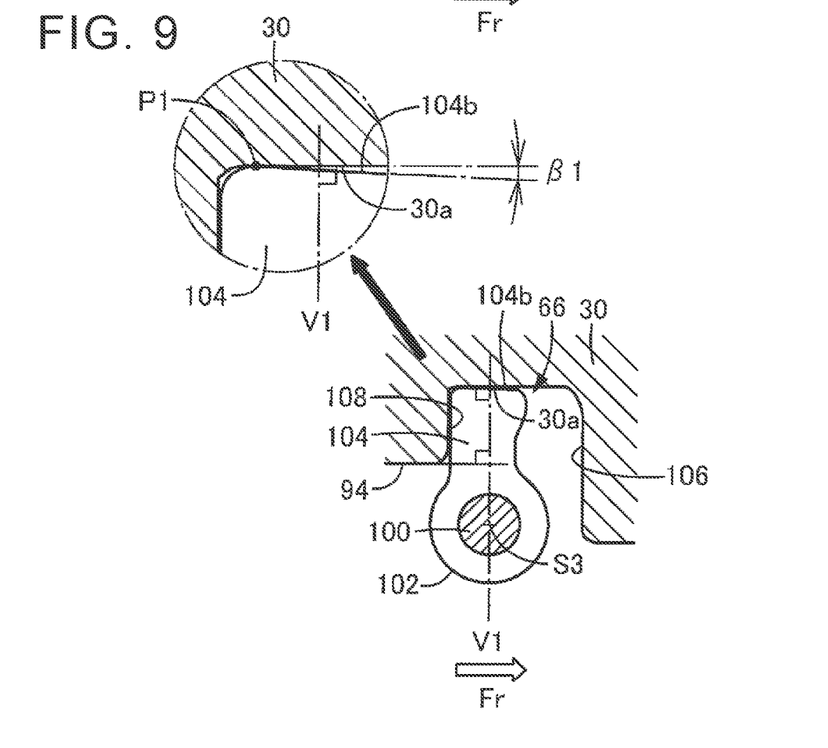
FIG. 9 illustrates the manner of engagement between the stopper and the support member according to a second modification of the first embodiment, including an enlarged view of the engagement portion.

FIG. 9 illustrates, as with FIG. 8, a portion in the vicinity of the stopper 66 in the parking locked state according to a second modification of the first embodiment, also illustrating an enlarged view of an engagement portion between the stopper 66 and the support member 30. An engagement surface 104b provided on the stopper 66 is different from the engagement surface 104a according to the first embodiment in FIG. 7. The engagement surface 104b is inclined by an angle β1 in the direction closer to the turning axis S3 toward the locked position, which is in the right direction in FIG. 9, with respect to a line that is parallel to the direction of movement of the lock member 42, that is, a line that is parallel to the guide portion 94. The angle β1 is in the range of about 0.5° to 2°, for example, and is about 1° in the second modification. The engagement surface 30a of the support member 30 to be engaged with the engagement surface 104b is parallel to the direction of movement of the lock member 42, and is engaged with the engagement surface 104b of the stopper 66 only at the engagement point P1. In the second modification, the engagement point P1 serves as the engagement portion.

With the second modification, the same function and effect as those of the first embodiment can be obtained. That is, when the stopper 66 is pressed between the cam roller 62 and the support member 30 because of a push-out load, variations in the posture of the stopper 66 are restrained and rotation of the cam roller 62 is suppressed, and torque in the direction of rolling toward the unlocked position generated in the cam roller 62 by the push-out load is reduced to suppress P-out. Additionally, the engagement surface 104b of the stopper 66 is inclined in the direction closer to the turning axis S3 toward the locked position. Therefore, when a push-out load acts on the lock member 42 and the stopper 66 is pressed against the support member 30, torque in the direction (counterclockwise direction in FIG. 9) in which the turning axis S3 of the stopper 66 is moved toward the locked position about the engagement point P1 is generated based on the inclination of the engagement surface 104b of the stopper 66, and a force Fr in the direction toward the locked position is applied to the lock member 42 via the attachment pin 100 of the stopper 66. Therefore, movement of the lock member 42 toward the unlocked position is hindered to suppress P-out further appropriately.

Figure 10:
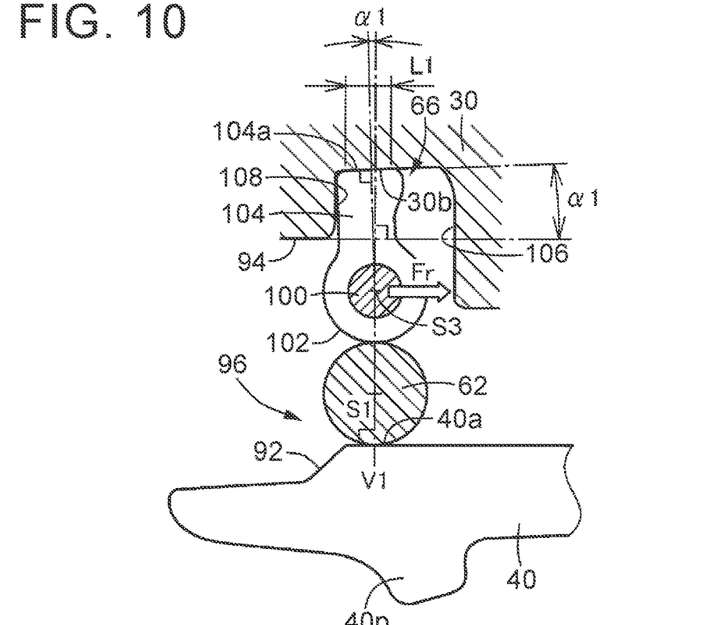
FIG. 10 illustrates the manner of engagement between the stopper and the support member according to a third modification of the first embodiment, corresponding to FIG. 7 for the first embodiment.

FIG. 10 illustrates a third modification of the first embodiment, which is different from the first modification in FIG. 8 in that the engagement surface 104a of the stopper 66 in the projecting posture is caused to tightly contact the engagement surface 30b of the support member 30 to be engaged in the predetermined engagement range L1. That is, in the projecting posture, a line that is perpendicular to the engagement surfaces 30b, 104a and that passes through the turning axis S3 is inclined toward the unlocked position by an angle α1 with respect to the vertical line V1 which is at right angles to an extension line of the guide portion 94 which is parallel to the direction of movement of the lock member 42. Thus, also with the third modification, when a push-out load acts on the cam roller 62 and the stopper 66 is pressed against the support member 30, a force Fr in the direction toward the locked position is applied to the lock member 42 based on the inclination of the engagement surface 30b, and movement of the lock member 42 toward the unlocked position is hindered to suppress P-out appropriately.

Figure 11:
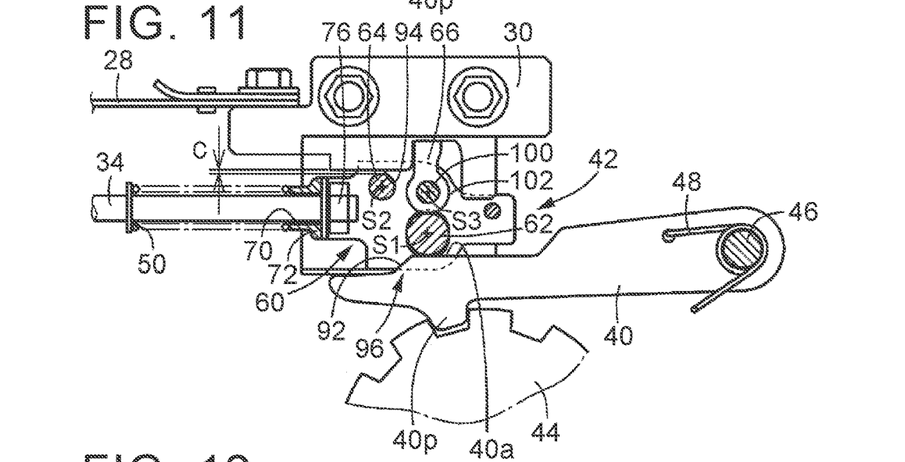
FIG. 11 illustrates a second embodiment of the present disclosure, corresponding to FIG. 2 for the first embodiment.

Next, a second embodiment of the present disclosure will be described. FIG. 11 corresponds to FIG. 2 for the first embodiment, and is different from the first embodiment in the relative arrangement position of the guide roller 64 with respect to the cam roller 62 and the stopper 66. The guide roller 64 is disposed on the relatively lower side in FIG. 11, that is, at a position away from the support member 30. In this case, in the parking locked state illustrated in FIG. 11, that is, in the state in which the stopper 66 takes the projecting posture and is engaged with the support member 30, a gap C is formed between the guide roller 64 and the guide portion 94 of the support member 30 and, when a push-out load is applied to the cam roller 62, all the push-out load is received by the support member 30 via the stopper 66. Thus, the stopper 66 is reliably pressed between the cam roller 62 and the support member 30 by the push-out load, which appropriately suppresses P-out at the time when the vehicle is parked on a slope road.

Figure 12:
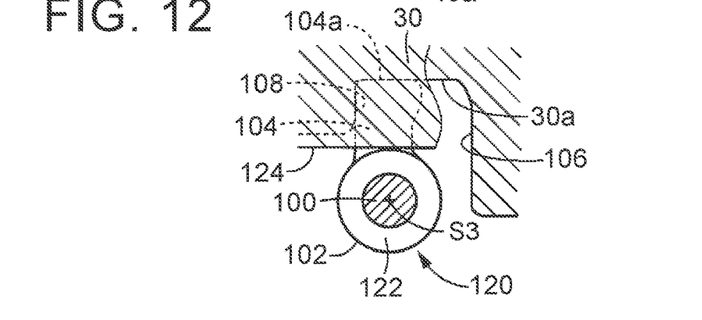
FIG. 12 illustrates a third embodiment of the present disclosure, illustrating the vicinity of the stopper in the parking locked state.

Next, a third embodiment of the present disclosure will be described. FIG. 12 illustrates a portion in the vicinity of a stopper 120 in the parking locked state. The stopper 120 integrally includes a guide roller 122 that has the same diameter as that of the cylindrical outer peripheral surface 102. That is, the guide roller 122 in a cylindrical shape is provided integrally at a portion that is adjacent to the projecting portion 104 in the axial direction of the stopper 120, or at a portion on the front side of the sheet surface of FIG. 12 in the third embodiment. On the other hand, the support member 30 is provided integrally with a guide portion 124 adjacent to a recess provided with the engagement surface 30a, the stopper guiding surface 106, and the stopper abutment surface 108. The guide roller 122 is engaged with the guide portion 124 and rolled to rotate, when the lock member 42 is moved between the locked position and the unlocked position, in order to restrict displacement of the lock member 42 toward the opposite side of the parking pawl 40. In this case, the number of components is reduced compared to the case where the guide roller 64 and the stopper 66 are provided separately as in the first embodiment, in addition to obtaining the same function and effect as those of the first embodiment.

Figure 13:
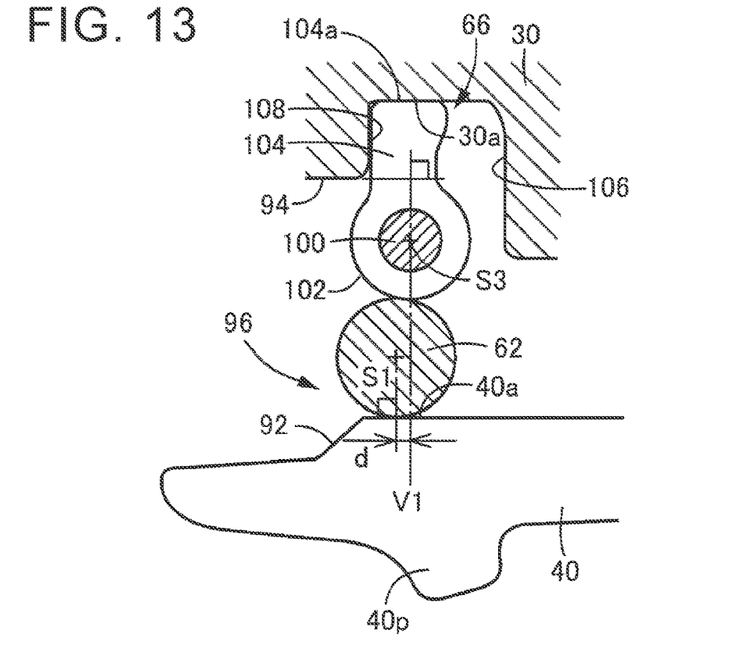
FIG. 13 illustrates a fourth embodiment of the present disclosure, corresponding to FIG. 7 for the first embodiment.

Next, a fourth embodiment of the present disclosure will be described. FIG. 13 corresponds to FIG. 7 for the first embodiment, and is different from the first embodiment in the arrangement position of the cam roller 62. That is, while the stopper 66 and the cam roller 62 are disposed such that the turning axis S3 of the stopper 66 and the axis S1 of the cam roller 62 are positioned on the vertical line V1 which is at right angles to an extension line of the guide portion 94 which extends in the direction of movement of the lock member 42 in the first embodiment, the cam roller 62 is disposed such that the axis S1 of the cam roller 62 is displaced by a dimension d toward the unlocked position with respect to the vertical line V1 which passes through the turning axis S3 in the fourth embodiment. In this case, when a push-out load directed upward in FIG. 13 is applied to the cam roller 62 and the cam roller 62 is pressed against the cylindrical outer peripheral surface 102 of the stopper 66, torque in the clockwise direction, that is, in the direction of moving the lock member 42 toward the locked position, is generated in the cam roller 62 because of the positional displacement by the dimension d, which appropriately suppresses P-out.

Figure 14:
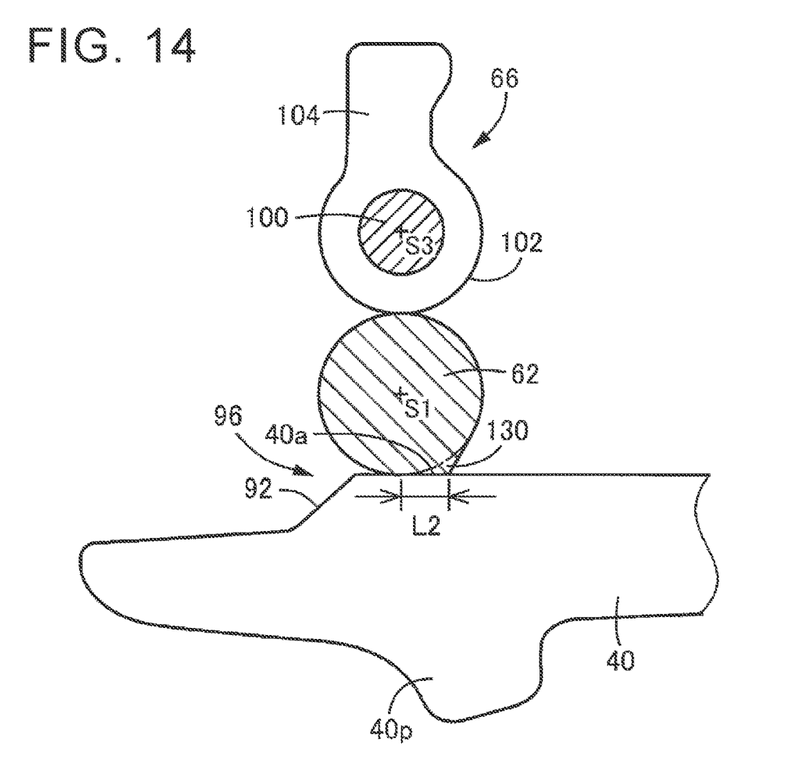
FIG. 14 is a front view illustrating a fifth embodiment of the present disclosure, illustrating a cam mechanism portion in the parking locked state as enlarged.
Figure 15:
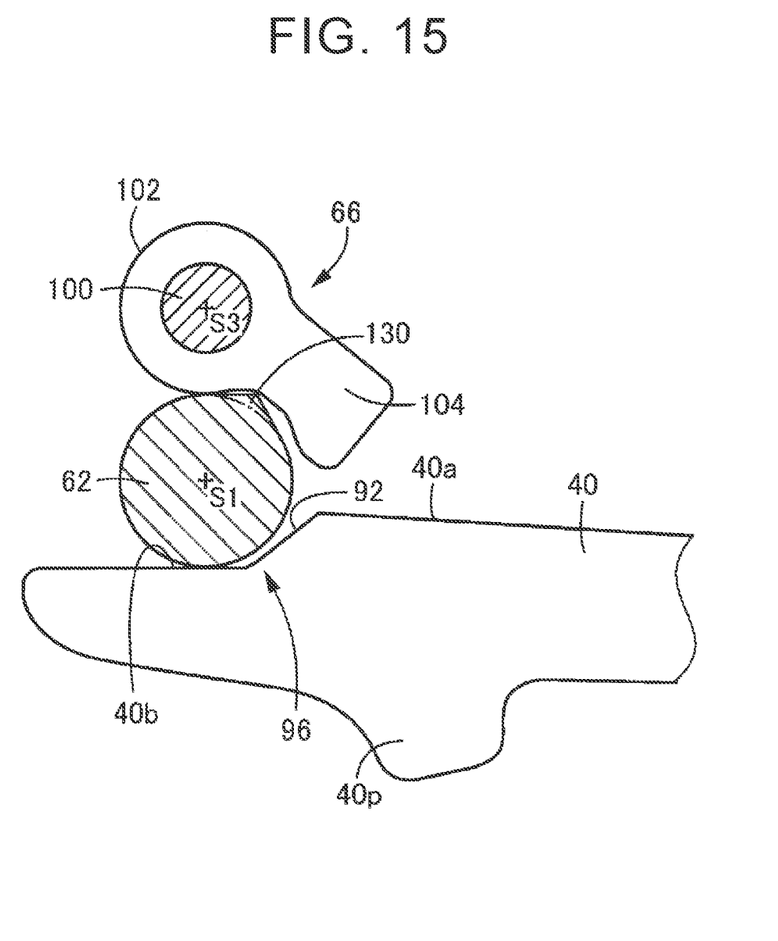
FIG. 15 illustrates the fifth embodiment in FIG. 14 in the unlocked state.

Next, a fifth embodiment of the present disclosure will be described. FIG. 14 is a front view illustrating a portion in the vicinity of the cam mechanism 96 in the parking locked state as enlarged. FIG. 15 is a front view illustrating a portion in the vicinity of the cam mechanism 96 in the unlocked state as enlarged. In the drawings, the outer peripheral surface of the cam roller 62 is provided with a fixing portion 130 that projects in the direction of the locked position, that is, in the right direction in FIG. 14, in the parking locked state, to be brought into contact with the lock-side engagement surface 40a of the parking pawl 40 over a predetermined engagement length L2. The fixing portion 130 has a sectional surface in the shape of an isosceles triangle when taken along a plane at right angles to the axis S1 with two sides of the isosceles triangle projecting in the directions of tangents to the outer peripheral surface of the cam roller 62. One of the two sides of the fixing portion 130 that does not contact the lock-side engagement surface 40a is changeable as appropriate, and may be provided to extend perpendicularly (in the direction of a normal line) to the outer peripheral surface, for example. The long dashed short dashed line indicated in the cam roller 62 is an auxiliary line indicating a perfect circle and drawn to clearly indicate the projecting shape of the fixing portion 130.

In this case, when a push-out load directed upward in FIG. 14 is applied to the parking pawl 40, the lock-side engagement surface 40a of the parking pawl 40 is pressed against the fixing portion 130 of the cam roller 62 by the push-out load, and sliding friction is caused at the contact portion. The rotational resistance caused before the cam roller 62 starts rolling is increased based on the sliding friction and the rolling resistance. Therefore, a force in the direction of moving back toward the unlocked position applied to the lock member 42 along with rolling of the cam roller 62 is reduced, and P-out in which the parking pawl 40 slips off from the parking gear 44 as the lock member 42 is moved back is suppressed. That is, when the contact portion between the cam roller 62 and the lock-side engagement surface 40a is elastically deformed based on the push-out load, the sliding friction is caused at the contact portion to increase the rotational resistance before the cam roller 62 is rolled and the fixing portion 130 is moved away from the lock-side engagement surface 40a. The predetermined engagement length L2 is determined appropriately in advance through an experiment etc. such that a targeted P-out suppression effect is obtained, and is in the range of about 20% to 40% of the diameter of the cam roller 62, for example.

In the fifth embodiment, rolling of the cam roller 62 itself is suppressed by the fixing portion 130 which is provided on the cam roller 62, and therefore P-out at the time when the vehicle is parked on a slope road is suppressed appropriately, in addition to obtaining the P-out suppression effect through the stopper 66 as in the first embodiment.

While embodiments of the present disclosure have been described in detail above based on the drawings, these are merely exemplary, and the present disclosure can be implemented in aspects in which a variety of modifications and improvements are made based on the knowledge of a person skilled in the art.

What is claimed is:

1. A vehicle parking lock mechanism comprising:
   a parking gear;
   a parking pawl provided to be movable closer to and away from the parking gear and configured to be meshed with the parking gear to hinder rotation of the parking gear;
   a lock member disposed to be reciprocally movable between a locked position and an unlocked position, the lock member being configured to move the parking pawl closer to the parking gear via a cam mechanism as the lock member is moved toward the locked position, to establish a parking locked state in which rotation of the parking gear is hindered by the parking pawl when the lock member is moved to the locked position; and
   a support member disposed on an opposite side of the lock member from the parking pawl and provided with a guide portion that is configured to guide movement of the lock member between the locked position and the unlocked position while restricting displacement of the lock member toward the opposite side of the parking pawl,
   wherein the cam mechanism includes a cam roller disposed on the lock member to be rotatable about an axis at right angles to a direction of movement of the lock member, and a cam surface provided on the parking pawl to be engageable with the cam roller, the cam mechanism being configured such that the parking pawl is moved closer to the parking gear to be meshed with the parking gear by engaging the cam surface with the cam roller when the lock member is moved from the unlocked position to the locked position; and
   wherein, in the vehicle parking lock mechanism, the lock member includes a stopper disposed on the lock member to be turnable about a turning axis which is parallel to the axis of the cam roller and including a cylindrical outer peripheral surface to be brought into rolling contact with an outer peripheral surface of the cam roller, the stopper being turned about the turning axis along with rotation of the cam roller via the cylindrical outer peripheral surface as the lock member is moved from the unlocked position toward the locked position, to be engaged with the support member by taking a projecting posture in which the stopper projects toward the support member in the parking locked state.

2. The vehicle parking lock mechanism according to claim 1, wherein a gap between the stopper and the support member is equal to or less than a gap between the lock member and the guide portion, the stopper being in the projecting posture in the parking locked state.

3. The vehicle parking lock mechanism according to claim 1, wherein the stopper is disposed on the lock member such that the turning axis and the axis of the cam roller are positioned on a line at right angles to the direction of movement of the lock member.

4. The vehicle parking lock mechanism according to claim 1, wherein an engagement portion of the stopper in the projecting posture for engagement with the support member includes a portion on a side of the unlocked position with respect to the turning axis in the direction of movement of the lock member.

5. The vehicle parking lock mechanism according to claim 4, wherein an engagement surface on a side of the support member to be engaged with the stopper at the engagement portion is inclined in a direction away from the turning axis toward the locked position with respect to a line that is parallel to the direction of movement of the lock member.

6. The vehicle parking lock mechanism according to claim 4, wherein an engagement surface on a side of the stopper to be engaged with the support member at the engagement portion is inclined in a direction closer to the turning axis toward the locked position with respect to a line that is parallel to the direction of movement of the lock member.

7. The vehicle parking lock mechanism according to claim 1, wherein the outer peripheral surface of the cam roller is provided with a fixing portion that projects toward the locked position in the parking locked state to be brought into contact with the parking pawl over a predetermined engagement length.

8. The vehicle parking lock mechanism according to claim 1, wherein the lock member is provided with a guide roller to be engaged with the guide portion and rolled to rotate, when the lock member is moved between the locked position and the unlocked position, in order to restrict displacement of the lock member toward the opposite side of the parking pawl.

* * * * *